United States Patent
Sugano et al.

(10) Patent No.: US 9,293,046 B2
(45) Date of Patent: Mar. 22, 2016

(54) VEHICLE REARWARD TRAVEL CONTROL DEVICE AND METHOD USING LATERAL AND REAR DETECTION AREAS

(71) Applicants: NISSAN MOTOR CO., LTD., Kanagawa (JP); VALEO RADAR SYSTEMS INC., Hudson, NH (US)

(72) Inventors: Takeshi Sugano, Yokohama (JP); Toshimichi Gokan, Machida (JP); Boris Marie, Hudson, NH (US)

(73) Assignees: Nissan Motor Co., Ltd., Yokohama-shi, Kanagawa (JP); Valeo Radar Systems Inc., Hudson, NH (US)

( * ) Notice: Subject to any disclaimer, the term of this patent is extended or adjusted under 35 U.S.C. 154(b) by 0 days.

(21) Appl. No.: 14/378,562

(22) PCT Filed: Feb. 15, 2013

(86) PCT No.: PCT/JP2013/053716
§ 371 (c)(1),
(2) Date: Aug. 13, 2014

(87) PCT Pub. No.: WO2013/122210
PCT Pub. Date: Aug. 22, 2013

(65) Prior Publication Data
US 2015/0015383 A1    Jan. 15, 2015

(30) Foreign Application Priority Data
Feb. 17, 2012   (JP) .................. 2012-033120

(51) Int. Cl.
*G08B 21/00* (2006.01)
*G08G 1/16* (2006.01)
*B60W 50/14* (2012.01)
*B60W 30/095* (2012.01)
*B60T 7/22* (2006.01)
*B60Q 9/00* (2006.01)

(52) U.S. Cl.
CPC ................ *G08G 1/165* (2013.01); *B60Q 9/006* (2013.01); *B60T 7/22* (2013.01); *B60W 30/095* (2013.01); *B60W 50/14* (2013.01); *B60K 2350/1096* (2013.01); *B60W 2050/143* (2013.01)

(58) Field of Classification Search
CPC ........................................................ C08G 1/165
USPC ................... 340/435, 436, 901, 903, 932.2; 701/301; 180/274
See application file for complete search history.

(56) References Cited

U.S. PATENT DOCUMENTS

| 6,265,968 | B1 | 7/2001 | Betzitza et al. |
| 8,577,515 | B2 | 11/2013 | Kobayashi et al. |
| 2012/0166017 | A1 | 6/2012 | Kobayashi et al. |

FOREIGN PATENT DOCUMENTS

| EP | 2026099 A1 | 2/2009 |
| JP | 11-328595 A | 11/1999 |
| JP | 2000-187075 A | 7/2000 |
| JP | 2009-107529 A | 5/2009 |
| JP | 2010-018167 A | 1/2010 |
| WO | 2011007835 A1 | 1/2011 |

*Primary Examiner* — Jeffery Hofsass
(74) *Attorney, Agent, or Firm* — Young Basile

(57) ABSTRACT

A travel control device includes a side obstacle detection unit, a rearward movement preparation detection unit, a warning unit, and a suppression unit. The side obstacle detection unit divides a range from a lateral side to a rear side of a vehicle into plural detection angle areas, and detects, for each of the plural detection angle areas, an obstacle entering the detection angle area and a distance to the obstacle. The warning unit provides warning about the obstacle. The suppression unit suppresses the warning by the warning unit, if the rearward movement preparation detection unit detects the vehicle preparing to move rearward and the detection angle area in which the obstacle is detected shifts from the rear side to the lateral side.

9 Claims, 7 Drawing Sheets

US 9,293,046 B2

VEHICLE REARWARD TRAVEL CONTROL DEVICE AND METHOD USING LATERAL AND REAR DETECTION AREAS

CROSS REFERENCE TO RELATED APPLICATION

The present application claims priority to Japanese Patent Application No. 2012-033120, filed Feb. 17, 2012 and incorporated herein in its entirety.

TECHNICAL FIELD

The present invention relates to a travel control device and a travel control method.

BACKGROUND

A technique for a vehicle to detect an obstacle approaching the surroundings of the vehicle by using an obstacle sensor mounted on the vehicle has heretofore been known.

For example, in Japanese Patent Application Publication No. 2009-107529, whether or not a vehicle will collide with a surrounding obstacle if traveling without changing its traveling direction is determined based on the shift position of the vehicle, the shape of a section where parking is permitted, and the position and inclination of the section relative to the vehicle. Then, if it is determined that a collision will not occur, issuance of alarm unnecessary for a driver is suppressed by correcting a result determined by obstacle approach decision means.

SUMMARY

In Japanese Patent Application Publication No. 2009-107529, however, when the vehicle is parallel parked, unnecessary alarm about a vehicle passing by a lateral side of the vehicle, even though there is no risk of collision, may be issued and give an uneasy feeling to the driver.

The present invention has been made in view of the foregoing problem. An object of the present invention is to provide a travel control device and a travel control method which reduce an uneasy feeling which a driver may have, by suppressing activation of warning about a vehicle passing by a driver's vehicle on a lateral side and not desired to be an object for warning, when the driver's vehicle is parallel parked.

A travel control device according to a first aspect of the present invention includes a side obstacle detection unit, a rearward movement preparation detection unit, a warning unit, and a suppression unit. The side obstacle detection unit divides a range from a lateral side to a rear side of a vehicle into plural detection angle areas, and detects, for each of the plural detection angle areas, an obstacle entering the detection angle area and a distance to the obstacle. The rearward movement preparation detection unit detects the vehicle preparing to move rearward. The warning unit provides warning about the obstacle detected by the side obstacle detection unit. The suppression unit suppresses the warning by the warning unit, if the rearward movement preparation detection unit detects the vehicle preparing to move rearward and the detection angle area in which the obstacle is detected shifts from the rear side to the lateral side.

A travel control method according to a second aspect of the present invention using a travel control device including the side obstacle detection unit, the rearward movement preparation detection unit, and the warning unit includes suppressing the warning by the warning unit, if the rearward movement preparation detection unit detects the vehicle preparing to move rearward and the detection angle area in which the obstacle is detected shifts from the rear side to the lateral side.

DESCRIPTION OF EMBODIMENTS

Figure 1:
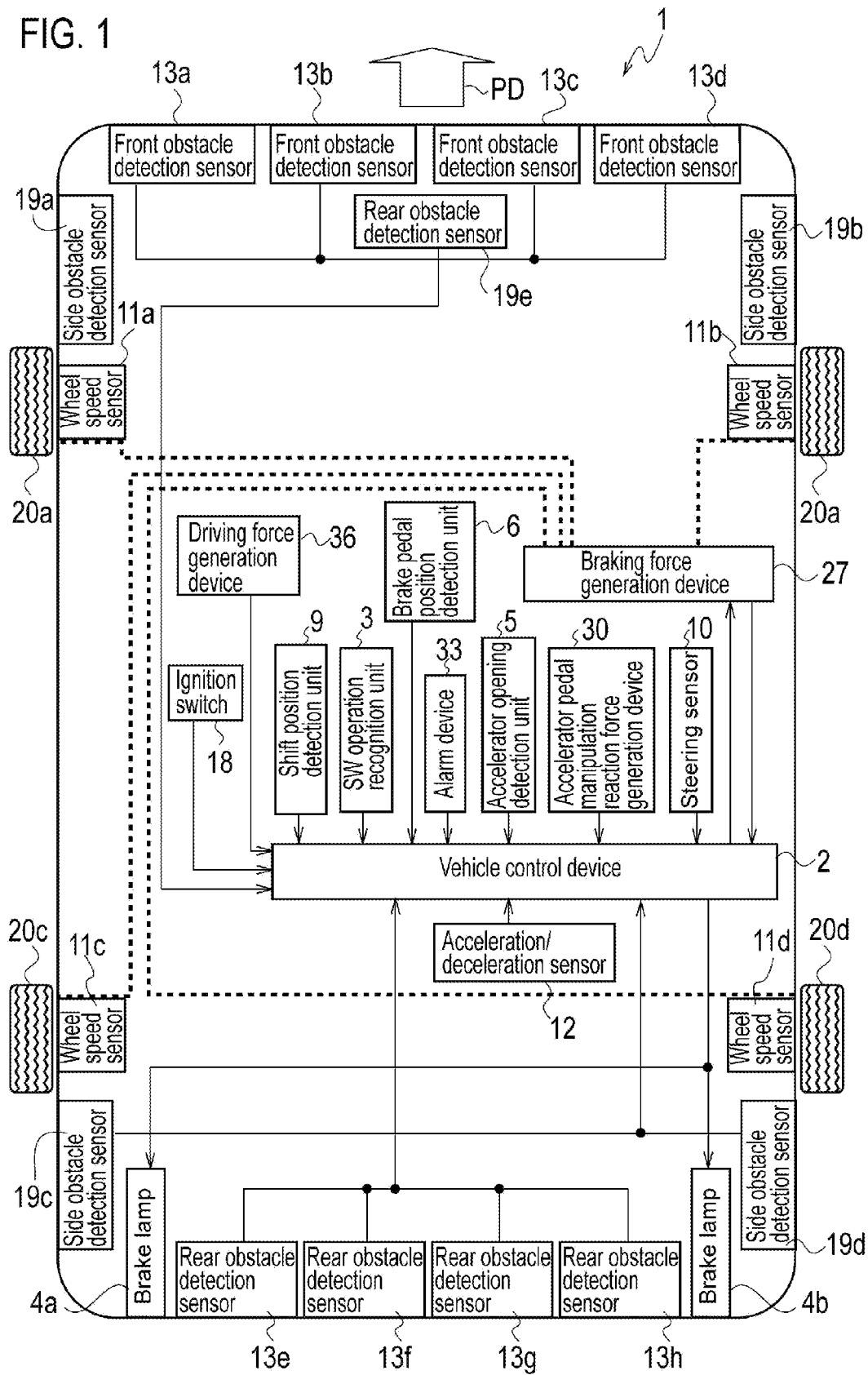
FIG. 1 is a schematic view illustrating an example of a vehicle layout of a travel control device according to an embodiment.

An embodiment of the present invention will be described below with reference to the drawings. In the disclosures of the drawings, the same portions are designated by the same reference characters.

[Travel Control Device]

Description will be given with reference to FIG. 1 with regard to an example of a vehicle layout of a travel control device according to an embodiment. A vehicle 1 is mounted with brake lamps 4a, 4b, an ignition switch 18 which provides commands to start and stop a driving force generation device including an engine and a motor, front obstacle detection sensors 13a to 13d, 19e which detect an obstacle approaching a front side PD of the vehicle 1, rear obstacle detection sensors 13e to 13h which detect an obstacle approaching a rear side of the vehicle 1, side obstacle detection sensors 19a to 19d which detect an obstacle approaching lateral sides of the vehicle 1, a driving force generation device 36 which generates a driving force for the vehicle, a braking force generation device 27, an accelerator pedal manipulation reaction force generation device 30, an alarm device 33 which alerts a driver that an obstacle is approaching, and a vehicle control device 2 which controls the overall vehicle 1.

The front obstacle detection sensors 13a to 13d are installed for example in a front bumper of the vehicle 1, and the rear obstacle detection sensors 13e to 13h are installed for example in a rear bumper of the vehicle 1. Sonar detectors which use ultrasonic waves to detect an obstacle entering a region relatively in the vicinity of the vehicle 1 and a distance to the obstacle can be used as the front obstacle detection sensors 13a to 13d and the rear obstacle detection sensors 13e to 13h. The side obstacle detection sensors 19a to 19d are arranged respectively one on each of left and right fenders of the vehicle 1 on the front side PD and the rear side, and the front obstacle detection sensor 19e is installed for example in the front bumper of the vehicle 1. Radar detectors which use electromagnetic waves to detect an obstacle entering a region relatively far away from the vehicle 1 can be used as the side obstacle detection sensors 19a to 19d and the front obstacle detection sensor 19e. Therefore, a distance to which the side obstacle detection sensors 19a to 19d and the front obstacle detection sensor 19e can detect the obstacle is longer than a distance to which the front obstacle detection sensors 13a to 13d and the rear obstacle detection sensors 13e to 13h can detect the obstacle. The vehicle control device 2 is configured by a processing unit such as an ECU (Engine Control Unit), and a CPU (Central Processing Unit) in the processing unit executes a previously stored computer program thereby to control operation of the overall vehicle 1.

A configuration of the travel control device according to the embodiment will be described with reference to FIG. 2. The travel control device according to the embodiment includes a vehicle information acquisition unit 21 which acquires information on the vehicle 1, a surrounding information acquisition unit 22 which acquires information on the surroundings of the vehicle, a system state selection unit 23, a control decision information calculation unit 24, and a warning device which issues a warning to an obstacle detected by the surrounding information acquisition unit 22. Here, the warning device includes a braking force generation system (25 to 27) which generates a braking force to give the warning of the approach of the obstacle, an accelerator pedal manipulation reaction force generation system (28 to 30) which generates an accelerator pedal manipulation reaction force to give the warning of the approach of the obstacle, an alarm system (31 to 33) which gives an alarm to the driver to give the warning of the approach of the obstacle, and a driving force generation system (34 to 36) which performs driving force control to give the warning of the approach of the obstacle.

Figure 3:
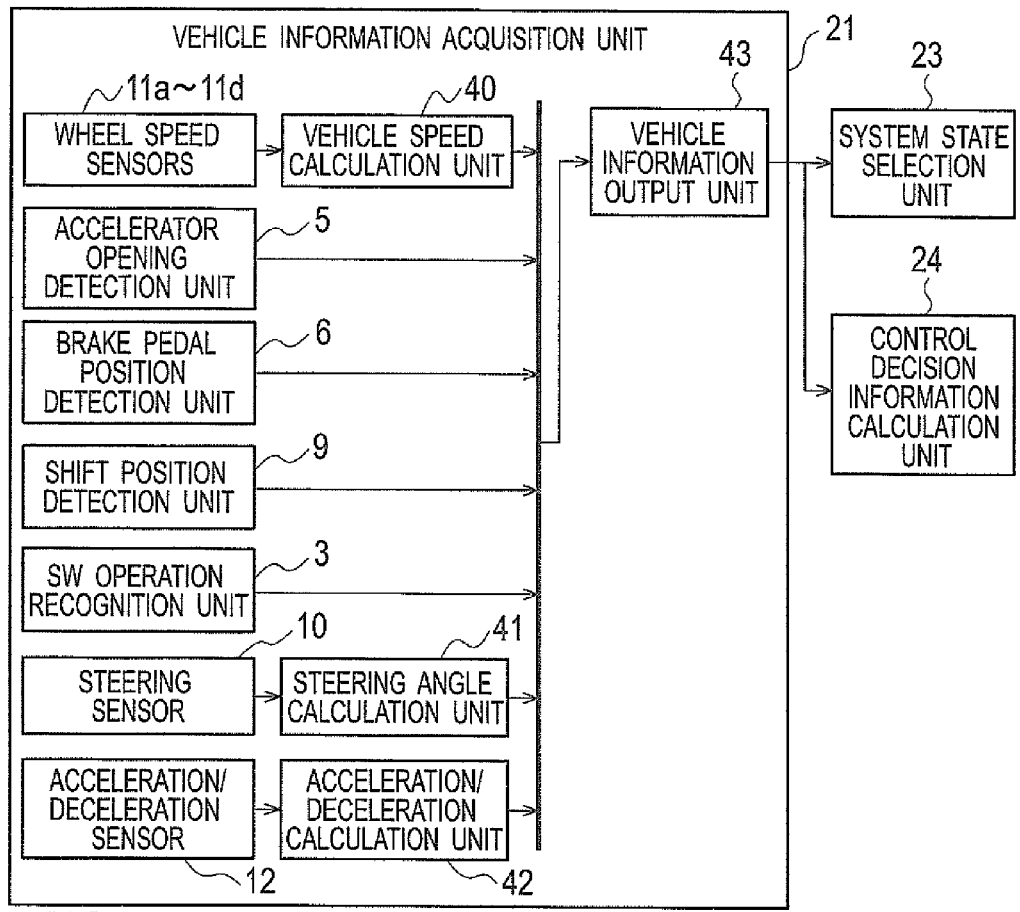
FIG. 3 is a block diagram illustrating a specific example of a configuration of a vehicle information acquisition unit 21 of FIG. 2.

As illustrated in FIG. 3, the vehicle information acquisition unit 21 includes wheel speed sensors 11a to 11d installed on wheels 20a to 20d, respectively, of the vehicle 1, an accelerator opening detection unit 5 installed on an accelerator pedal of the vehicle 1, a brake pedal position detection unit 6 which detects the position of a brake pedal of the vehicle 1, a shift position detection unit 9 (or a rearward movement preparation detection unit) which detects the shift position of the vehicle 1, an SW operation recognition unit 3 which detects the state of an on-off switch for the travel control device, a steering sensor 10 which detects a steering angle of a steering wheel of the vehicle 1, and an acceleration/deceleration sensor 12 which detects acceleration or deceleration of the vehicle 1.

The wheel speed sensors 11a to 11d detect rotation speeds of the wheels 20a to 20d, respectively, of the vehicle 1. A vehicle speed calculation unit 40 calculates a vehicle speed (or a wheel speed) from the rotation speeds of the wheels 20a to 20d, taking into account a radius of rotation of the wheels 20a to 20d. Further, the vehicle speed calculation unit 40 calculates a travel distance by integrating the vehicle speed. The brake pedal position detection unit 6 detects whether or not the driver is depressing the brake pedal, and detects the amount of depression of the brake pedal. The shift position detection unit 9 detects the state of the shift position in order to detect the present state of a transmission. An example of detection of the vehicle 1 preparing to move rearward includes detection of a rearward movement (R) position by the shift position detection unit 9. The SW operation recognition unit 3 detects the switch state of the travel control device and the switch state of the ignition switch 18. A steering angle calculation unit 41 performs filtering processing on the steering angle of the steering wheel detected by the steering sensor 10, as needed. An acceleration/deceleration calculation unit 42 performs filtering processing on the acceleration or deceleration of the vehicle 1 detected by the acceleration/deceleration sensor 12, as needed. A vehicle information output unit 43 transfers the wheel speed of the vehicle 1, an accelerator opening, the position of the brake pedal, the shift position, the state of the on-off switch for the travel control device, the steering angle of the steering wheel and the acceleration or deceleration, as vehicle information, to the system state selection unit 23 or the control decision information calculation unit 24. The vehicle speed calculation unit 40, the steering angle calculation unit 41, the acceleration/deceleration calculation unit 42 and the vehicle information output unit 43 can be configured as a portion of the vehicle control device 2 of FIG. 1. Of course, a processing unit which is different from the vehicle control device 2 is prepared, and a CPU in the processing unit executes a previously stored computer program. This may implement operation of the vehicle speed calculation unit 40, the steering angle calculation unit 41, the acceleration/deceleration calculation unit 42 and the vehicle information output unit 43.

Figure 4:
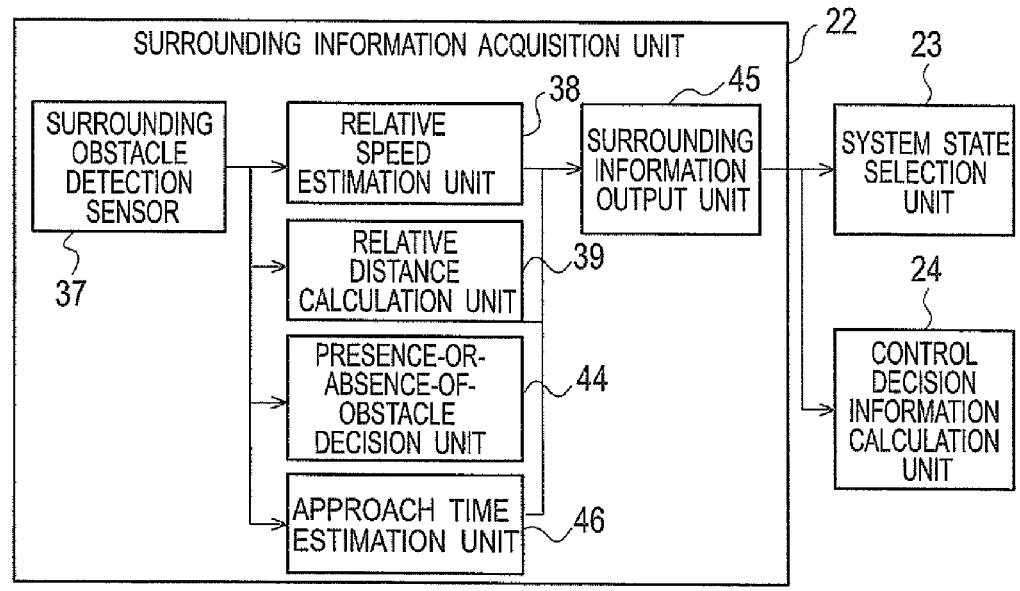
FIG. 4 is a block diagram illustrating a specific example of a configuration of a surrounding information acquisition unit 22 of FIG. 2.

A detailed example of a configuration of the surrounding information acquisition unit 22 will be described with reference to FIG. 4. The surrounding information acquisition unit 22 includes the front obstacle detection sensors 13a to 13d, 19e, the rear obstacle detection sensors 13e to 13h, and the side obstacle detection sensors 19a to 19d, which are installed on the front, rear and lateral sides of the vehicle 1 illustrated in FIG. 1 so as to be configured as a surrounding obstacle detection sensor 37. A relative distance calculation unit 39 performs filtering processing on a value of a distance from an obstacle detected by the surrounding obstacle detection sensor 37, as needed. A relative speed estimation unit 38 estimates a speed relative to the obstacle from the distance to the obstacle. The sign of the relative speed is such that a positive sign indicates a direction in which the obstacle approaches the vehicle 1 and a negative sign indicates a direction in which the obstacle moves away from the vehicle 1. An approach time estimation unit 46 calculates the time (or approach time) required for the obstacle to approach the vehicle 1 from the distance to the obstacle detected by the side obstacle detection sensors 19a to 19d and the relative speed estimated by the relative speed estimation unit 38. The approach time may be determined for example by obtaining TTC (Time-To-Collision) by dividing the distance to the obstacle by the relative speed. A presence-or-absence-of-obstacle decision unit 44 outputs a signal indicating whether or not the surrounding obstacle detection sensor 37 has detected the obstacle. A surrounding information output unit 45 transfers the presence or absence of a possible obstacle which may be present at the front side PD, the rear side and the lateral sides of the vehicle 1, the distance to the obstacle and the relative speed, and the approach time and a direction or angle of detection of the obstacle to be described later, as surrounding information, to the system state selection unit 23 or the control decision information calculation unit 24. The relative distance calculation unit 39, the relative speed estimation unit 38, the approach time estimation unit 46, the presence-or-absence-of-obstacle decision unit 44 and the surrounding information output unit 45 can be configured as a portion of the vehicle control device 2 of FIG. 1. Of course, a processing unit which is different from the vehicle control device 2 is prepared, and a CPU in the processing unit executes a previously stored computer program. This may implement operation of the relative distance calculation unit 39, the relative speed estimation unit 38, the approach time estimation unit 46, the presence-or-absence-of-obstacle decision unit 44 and the surrounding information output unit 45.

The system state selection unit 23 determines whether to set the system state to the on or off state, based on the state of the on-off switch for the travel control device detected by the SW operation recognition unit 3.

Figure 6:
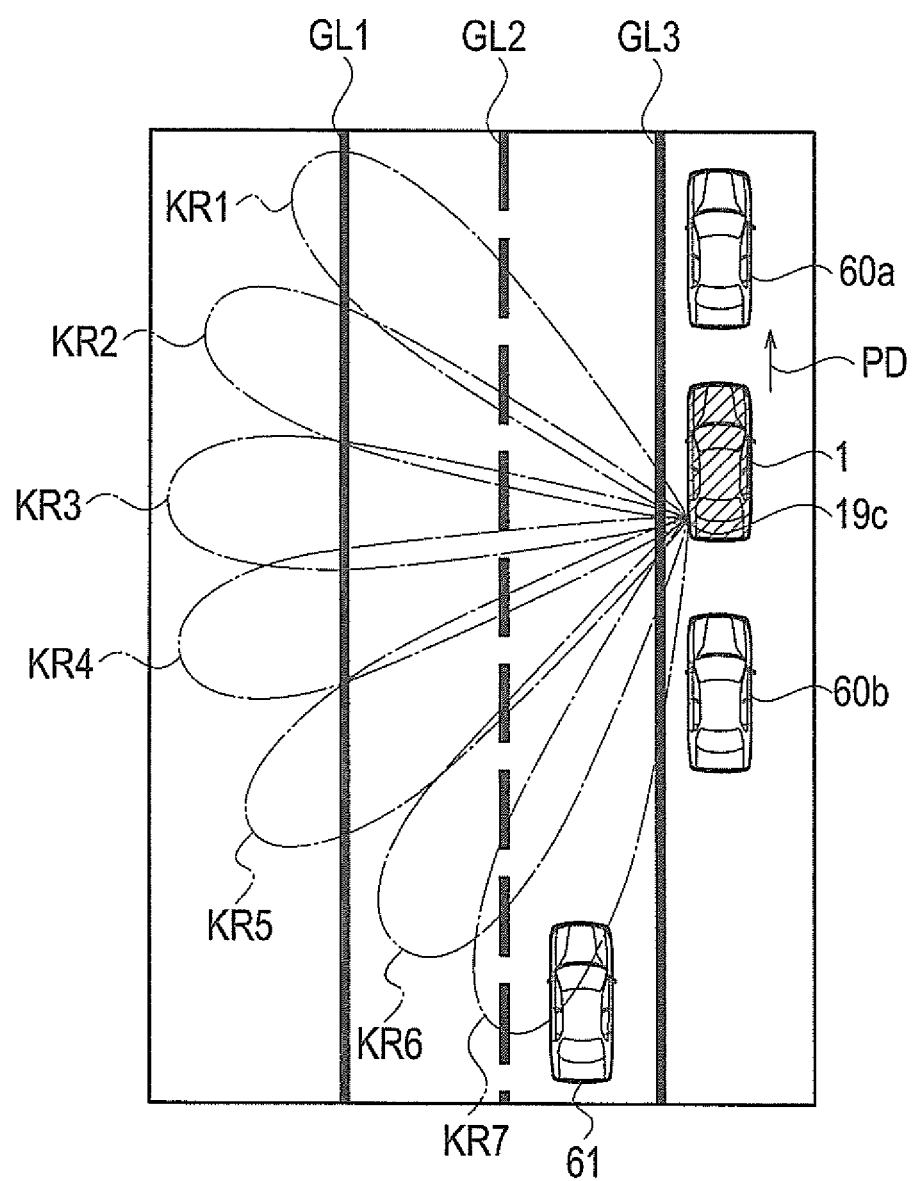
FIG. 6 is a plan view illustrating a lateral side detection region in which a side obstacle detection sensor 19c can detect an obstacle.

Description will be given with reference to FIG. 6 with regard to a lateral side detection region, taking the side obstacle detection sensor 19c as an example. The side obstacle detection sensor 19c installed on a rear fender of the vehicle 1 on the left side thereof toward the rear thereof can detect a vehicle 61 entering a sector-shaped region (or the lateral side detection region) with a predetermined angle, including the lateral side of the vehicle 1, and ranging from the lateral side to the rear side of the vehicle 1, centered about the side obstacle detection sensor 19c. The side obstacle detection sensor 19c can divide the lateral side detection region into plural detection angle areas KR1 to KR7, and detect, for each of the plural detection angle areas KR1 to KR7, an obstacle entering the detection angle area and a distance to the obstacle. Which of the detection angle areas KR1 to KR7 the obstacle is detected in can be determined for example by horizontally scanning electromagnetic waves in the lateral side detection region. The number of areas divided is not limited to seven but may be set less or more than seven. Incidentally, the other side obstacle detection sensors 19a, 19b, 19d are the same as the side obstacle detection sensor 19c. Here, the laterals or sides of the vehicle 1 refers to sides in a direction perpendicular to the parking direction PD of the vehicle 1, and FIG. 6 illustrates a left side as the lateral side. The rear of the vehicle 1 refers to a side in a direction rotated 180° with respect to the parking direction PD of the vehicle 1. The boundary of the plural detection angle areas KR1 to KR7 on the rear side is located on the lateral side of a half-line extending rearward from the side obstacle detection sensor 19c.

Figure 5:
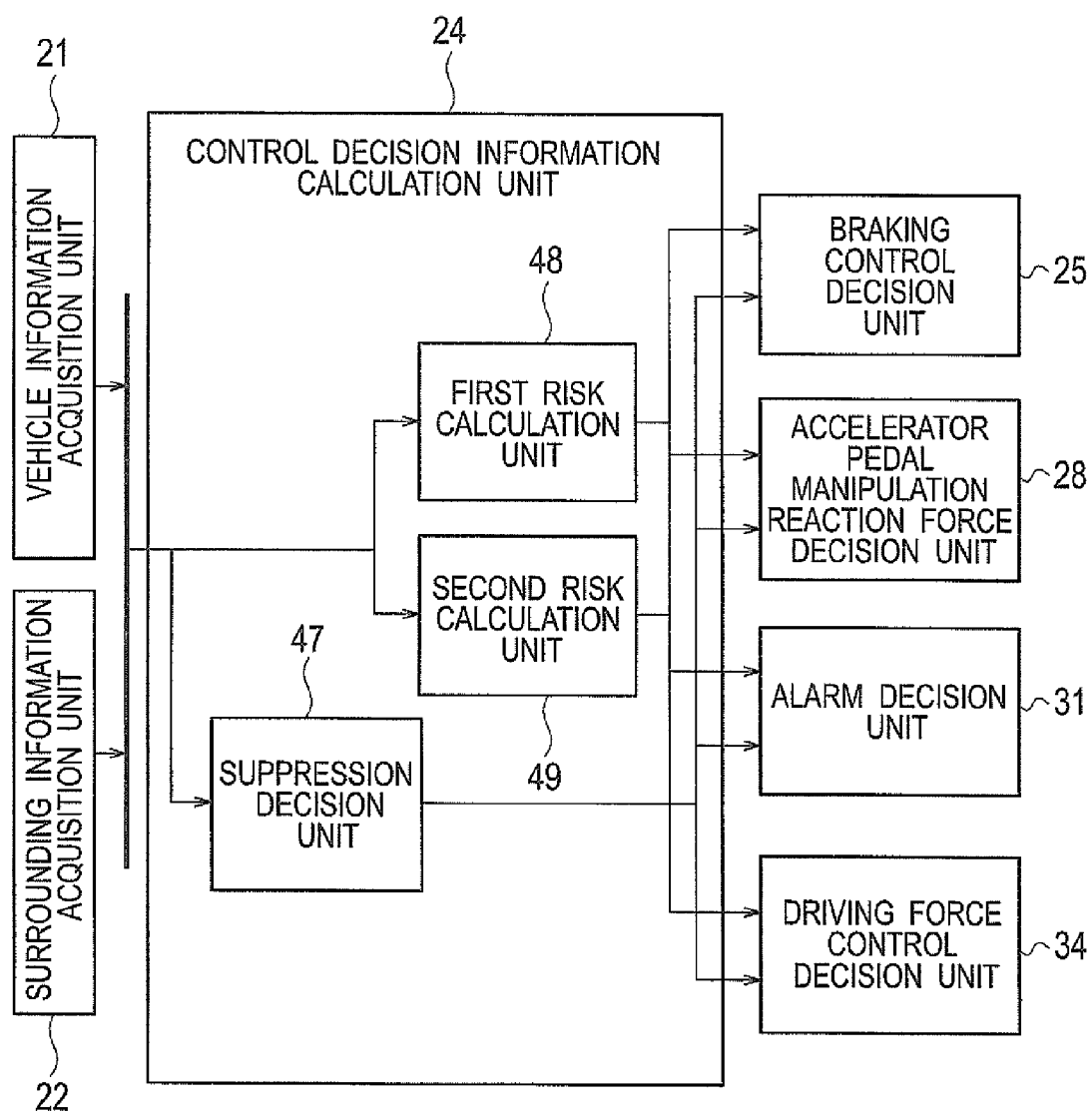
FIG. 5 is a block diagram illustrating a specific example of a configuration of a control decision information calculation unit 24 of FIG. 2.

A specific example of a configuration of the control decision information calculation unit 24 of FIG. 2 will be described with reference to FIG. 5. The control decision information calculation unit 24 includes a suppression decision unit 47 (or a suppression unit) which determines whether or not to suppress warning by a warning unit, a first risk calculation unit 48 which calculates a first risk (or a rear warning threshold) as a criterion of judgment of warning, and a second risk calculation unit 49 which calculates a second risk as a criterion of judgment of warning. A result determined by the suppression decision unit 47 and results calculated by the first risk calculation unit 48 and the second risk calculation unit 49 are transmitted to a braking control decision unit 25, an accelerator pedal manipulation reaction force decision unit 28, an alarm decision unit 31, and a driving force control decision unit 34.

The first risk calculation unit 48 first calculates a base value of the first risk. The base value of the first risk is used as a reference value to determine whether or not to provide warning based on a distance to an obstacle detected by the rear obstacle detection sensors 13e to 13h. The base value of the first risk is a distance which varies according to the vehicle speed. For example, the higher vehicle speed leads to the larger base value of the first risk. When the vehicle speed is equal to zero, the base value of the first risk may be offset to take on a predetermined value. Also, the base value of the first risk may be changed according to the approach time estimated by the approach time estimation unit 46. Therefore, for example, the first risk calculation unit 48 may calculate the base value of the first risk from the vehicle speed and the approach time by referring to data indicating a relationship between the vehicle speed and the base value of the first risk and data indicating a relationship between the approach time and the base value of the first risk.

Then, the first risk calculation unit 48 calculates the first risk for each warning control from the base value of the first risk by using a coefficient for each warning control. For example, the first risk for each warning control can be calculated by varying weights for each warning control by multiplying the base value by a coefficient R1_K1 for braking control, multiplying the base value by a coefficient R1_K2 for accelerator pedal manipulation reaction force control, multiplying the base value by a coefficient R1_K3 for alarm control, and multiplying the base value by a coefficient R1_K4 for driving force control. For example, the coefficients are set to values which lie between 0 and 1 inclusive, and are such that the following relationship is established: R1_K1≤R1_K2≤R1_K4≤R1_K3. This enables weighting such that the alarm, the driving force control, the accelerator pedal manipulation reaction force control, and the braking control are performed in this order.

The second risk calculation unit 49 first calculates a base value of the second risk. The base value of the second risk includes a base value of the second risk (the distance) and a base value of the second risk (the approach time). The base value of the second risk (the distance) is used as a reference value to determine whether or not to provide warning based on a distance to an obstacle detected by the side obstacle detection sensors 19a to 19d. The base value of the second risk (the approach time) is used as a reference value to determine whether or not to provide warning based on the approach time estimated by the approach time estimation unit 46. The base value of the second risk (the distance) varies according to the vehicle speed. Specifically, in the same manner as the first risk (the distance), the higher vehicle speed leads to the larger base value of the second risk (the distance). For example, the second risk calculation unit 49 can calculate the base value of the second risk (the distance) from the vehicle speed by referring to data indicating a relationship between the vehicle speed and the base value of the second risk (the distance). Also, the base value of the second risk (the distance) may be set to a different value from the base value of the first risk. In this case, it is desirable that the base value of the second risk (the distance) be set to a larger value than the base value of the first risk. When the vehicle speed is equal to zero, the base value of the second risk (the distance) may be offset to take on a predetermined value. Also, the base value of the second risk (the distance) may be changed according to the approach time calculated by the relative speed estimation unit 38.

Then, the second risk calculation unit 49 calculates the second risk (the distance) and the second risk (the approach time) for each warning control from the base value of the second risk (the distance) and the base value of the second risk (the approach time) by using a coefficient for each warning control. For example, the second risk (the distance) and the second risk (the approach time) for each control are calculated by varying weights for each control by multiplying the base value by a coefficient R2_K1 for braking control, multiplying the base value by a coefficient R2_K2 for accelerator pedal manipulation reaction force control, multiplying the base value by a coefficient R2_K3 for alarm control, and multiplying the base value by a coefficient R2_K4 for driving force control. For example, the coefficients are set to values which lie between 0 and 1 inclusive, and are such that the following relationship is established: $R2\_K1 \leq R2\_K2 \leq R2\_K4 \leq R2\_K3$. This enables weighting such that the alarm, the driving force control, the accelerator pedal manipulation reaction force control, and the braking control are performed in this order.

The suppression decision unit 47 suppresses warning by the warning unit, if the side obstacle detection sensors 19a to 19c detect the vehicle 61 passing by the lateral side of the vehicle 1 when the vehicle 1 is parallel parked, as illustrated in FIG. 6. Specifically, if (or under a condition A-1 where) the shift position detection unit 9 detects the rearward movement position and the detection angle area KR1 to KR7 in which the obstacle is detected shifts from the rear side to the lateral side, the suppression decision unit 47 determines that the obstacle is the vehicle 61 passing by the lateral side of the vehicle 1 when the vehicle 1 moves rearward. Then, the suppression decision unit 47 suppresses warning about the obstacle to be provided by the warning unit. In FIG. 6, the vehicle 1 is parallel parked between a vehicle 60a and a vehicle 60b lined up in their longitudinal direction. A roadway divided by traffic lanes GL1 to GL3 is adjacent to the vehicle 1 of FIG. 6. The traffic lanes GL1 to GL3 are straight lines substantially parallel to the parking direction PD of the vehicle 1. In this situation, the vehicle 61 running along the roadway in the parking direction PD of the vehicle 1 passes by and runs past the vehicle 1. At this time, the detection angle areas KR1 to KR7 in which the obstacle (or the vehicle 61) is detected shift in the following order: KR7, KR6, KR5, KR2, KR1. In other words, the obstacle (or the vehicle 61) moves from the detection angle area on the rear side to the detection angle area on the lateral side. Therefore, if the detection angle area KR1 to KR7 in which the obstacle is detected shifts from the rear side to the lateral side, the suppression decision unit 47 determines that the obstacle is the vehicle 61 passing by the lateral side of the vehicle 1, and does not provide the warning about the obstacle or reduces the level or degree of warning to low even if the obstacle approaches the vehicle 1. This enables suppressing unnecessary warning, thus reducing an uneasy feeling which the driver may have. Suppressions of the warning by the warning unit include providing no warning, delaying the timing of warning, and reducing the level or degree of warning to low. For example, the suppression decision unit 47 can stop providing the warning or delay the timing of warning by setting the base value of the first risk or the base value of the second risk to 0 or setting the base value small.

Figure 8:
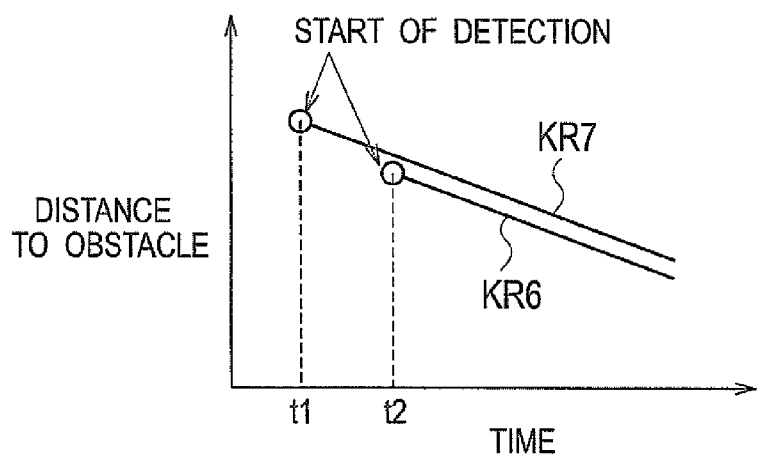
FIG. 8 is a graph showing a case where, first (or at time t1), the obstacle is detected in a rearmost detection angle area KR7, and then (or at time t2), the obstacle is detected in a detection angle area KR6 adjacent to the rearmost detection angle area KR7.

Cases where the detection angle area KR1 to KR7 in which the obstacle is detected shifts from the rear side to the lateral side include a case where, first (or at time t1), the obstacle is detected in the rearmost detection angle area KR7, and then (or at time t2), the obstacle is detected in the detection angle area KR6 adjacent to the rearmost detection angle area KR7, as illustrated in FIG. 8. As illustrated in FIG. 6, the vehicle 61 passing by the lateral side of the vehicle 1 first enters the rearmost detection angle area KR7 among the detection angle areas KR1 to KR7, and then enters the detection angle area KR6. Therefore, the obstacle can be judged as the vehicle 61 passing by the lateral side of the vehicle 1.

Figure 9:
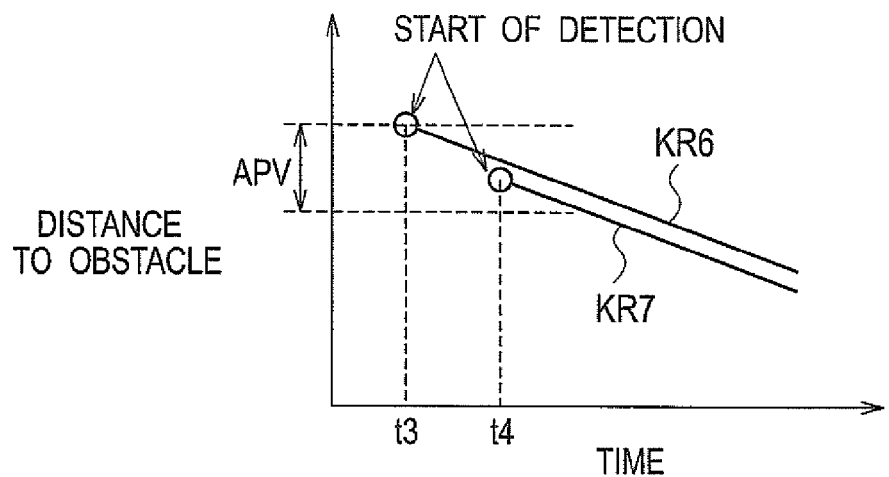
FIG. 9 is a graph showing a case where detection of a vehicle 61 starts first in the detection angle area KR6, and then, during a predetermined allowable time lag APV, the detection of the vehicle 61 starts also in the detection angle area KR7.

The cases where the detection angle area KR1 to KR7 in which the obstacle is detected shifts from the rear side to the lateral side may further include a case where the side obstacle detection sensors 19a to 19c start detecting the obstacle simultaneously in the rearmost detection angle area KR7 and the detection angle area KR6 adjacent to the rearmost detection angle area KR7, as illustrated in FIG. 9. If a distance between the vehicle 1 and the traffic lane along which the vehicle 61 is running is greater than that of FIG. 6, detection of the vehicle 61 may start simultaneously in the detection angle area KR7 and the detection angle area KR6. Even in such a case, warning which gives an uneasy feeling to the driver can be further suppressed by determining that the obstacle is the vehicle 61 passing by the lateral side of the vehicle 1. Here, the expression "start detecting the obstacle simultaneously" includes a case where the detection of the vehicle 61 starts first in the detection angle area KR6, and then, during a predetermined allowable time lag APV, the detection of the vehicle 61 starts also in the detection angle area KR7, as illustrated in FIG. 9. The allowable time lag APV is 100 cm, for example, in terms of distance.

The suppression decision unit 47 may suppress warning by the warning unit, rather than under the condition A-1, if (or under a condition A-2 where) the shift position detection unit 9 detects the rearward movement position and the obstacle is simultaneously detected for a predetermined time or longer in the rearmost detection angle area KR7 and the detection angle area KR6 adjacent to the rearmost detection angle area KR7. Thereby, a warning can be issued about the obstacle which is not simultaneously detected for the predetermined time or longer in the detection angle area KR7 and the detection angle area KR6, and thus, proper warning suppression control can be achieved. Alternatively, the suppression decision unit 47 may add the condition A-2 to the condition A-1 to make a decision.

The suppression decision unit 47 may suppress warning by the warning unit, rather than under the condition A-1 or the condition A-2, only if (or under a condition A-3 where) the shift position detection unit 9 detects the rearward movement position and the approach time for the obstacle detected in the rearmost detection angle area KR7 or the detection angle area KR6 adjacent to the rearmost detection angle area KR7 is shorter than an approach threshold (for example, 4 seconds). If the approach time for the obstacle is shorter than the approach threshold, there is a great likelihood that the obstacle may be the vehicle 61 passing by the lateral side of the vehicle 1, and thus, proper warning suppression control can be achieved. Alternatively, the suppression decision unit 47 may add a condition A-3 to the condition A-1 or the condition A-2 to make a decision, or may determine to suppress warning only when the conditions A-1 to A-3 are all satisfied.

Even if a decision is temporarily made to suppress warning, the suppression decision unit 47 may then cancel suppression of the warning if a certain condition is satisfied. For example, if (or under a condition B-1 where) the obstacle is no longer detected in the detection angle area KR6 adjacent to the rearmost detection angle area KR7 before being no longer detected in the rearmost detection angle area KR7, the suppression decision unit 47 cancels the suppression of the warning. A decision can be made that the obstacle which is no longer detected in the detection angle area KR6 before being no longer detected in the rearmost detection angle area KR7 is not the vehicle 61 passing by the lateral side of the vehicle 1. In this case, therefore, a proper warning can be issued by canceling the suppression of the warning.

The suppression decision unit 47 may cancel suppression of warning, rather than under the condition B-1, if (or under a condition B-2 where) the side obstacle detection sensors 19a to 19c detect the obstacle in the other detection angle areas KR1 to KR5 exclusive of the rearmost detection angle area KR7 and the detection angle area KR6 adjacent to the rearmost detection angle area KR7. A decision can be made that the obstacle detected in the other detection angle areas KR1 to KR5 exclusive of the rearmost detection angle area KR7 and the detection angle area KR6 is not the vehicle passing by the lateral side of the vehicle 1, and thus, a proper warning can be issued by canceling the suppression of the warning. Alternatively, the suppression may be canceled only when the conditions B-1 and B-2 are all satisfied.

Returning to FIG. 2, the braking force generation system (25 to 27) includes the braking control decision unit 25 which determines whether or not to perform braking force control to give a warning of the approach of an obstacle, a braking control unit 26, and the braking force generation device 27 which performs the braking force control to give the warning of the approach of the obstacle under control by the braking control unit 26. The accelerator pedal manipulation reaction force generation system (28 to 30) includes the accelerator pedal manipulation reaction force decision unit 28 which determines whether or not to perform accelerator pedal manipulation reaction force control to give the warning of the approach of the obstacle, an accelerator pedal manipulation reaction force control unit 29, and the accelerator pedal manipulation reaction force generation device 30 which performs the accelerator pedal manipulation reaction force control to give the warning of the approach of the obstacle under control by the accelerator pedal manipulation reaction force control unit 29. The alarm system (31 to 33) includes the alarm decision unit 31 which determines whether or not to give an alarm to the driver to give the warning of the approach of the obstacle, an alarm control unit 32, and the alarm device 33 which gives the alarm to the driver to give the warning of the approach of the obstacle under control by the alarm control unit 32. The driving force generation system (34 to 36) includes the driving force control decision unit 34 which determines whether or not to perform driving force control to give the warning of the approach of the obstacle, a driving force control unit 35, and the driving force generation device 36 which performs the driving force control to give the warning of the approach of the obstacle under control by the driving force control unit 35.

The first risk, the second risk (the distance) and the second risk (the approach time) calculated for each control are transmitted to the braking control decision unit 25, the accelerator pedal manipulation reaction force decision unit 28, the alarm decision unit 31, and the driving force control decision unit 34.

The braking control decision unit 25 determines to generate a braking force to give the warning of the approach of the obstacle, when any of conditions A01 to A03 described below is established. It is to be here noted that the distance to the obstacle detected by the rear obstacle detection sensors 13e to 13h is referred to as a "rear sensor detected distance," the distance to the obstacle detected by the side obstacle detection sensors 19a to 19d is referred to as a "side sensor detected distance," and the approach time calculated by the approach time estimation unit 46 is referred to as "side sensor approach time." The first risk, the second risk (a distance value) and the second risk (the approach time) obtained by multiplying their base values by the coefficient R1_K1 or R2_K1 for the braking control are referred to as the first risk for braking, the second risk (the distance value) for braking and the second risk (the approach time) for braking, respectively.

A01: the first risk for braking>the rear sensor detected distance

A02: the second risk (the distance value) for braking>the side sensor detected distance A03: the second risk (the approach time) for braking>the side sensor approach time When the braking control decision unit 25 determines to activate warning by braking, the braking control unit 26 increases a brake pressure at a predetermined rate of change, and then, when a predetermined target brake pressure is reached, the braking control unit 26 maintains the brake pressure as it is. When hold time reaches a predetermined time (for example, 0.8 seconds), or when a predetermined time elapses after the vehicle speed has become equal to 0, the brake pressure is reduced to 0 at a predetermined rate of change. Incidentally, the predetermined rate of change and the predetermined target brake pressure may both be changed according to the vehicle speed or the distance to the obstacle. The braking force generation device 27 controls actual brake pressures on the wheels 20a to 20d so as to achieve the target brake pressure calculated by the braking control unit 26.

The accelerator pedal manipulation reaction force decision unit 28 determines to generate an accelerator pedal manipulation reaction force to give the warning of the approach of the obstacle, when any of conditions A04 to A06 described below is established. It is to be here noted that the first risk, the second risk (the distance value) and the second risk (the approach time) obtained by multiplying their base values by the coefficient R1_K2 or R2_K2 for the accelerator pedal manipulation reaction force are referred to as the first risk for APD, the second risk (the distance value) for APD and the second risk (the approach time) for APD, respectively.

A04: the first risk for APD>the rear sensor detected distance

A05: the second risk (the distance value) for APD>the side sensor detected distance A06: the second risk (the approach time) for APD>the side sensor approach time When the accelerator pedal manipulation reaction force decision unit 28 determines to generate the accelerator pedal manipulation reaction force, the accelerator pedal manipulation reaction force control unit 29 increases a reaction force command value at a predetermined rate of change, and then, when a predetermined reaction force command value is reached, the accelerator pedal manipulation reaction force control unit 29 maintains the reaction force command value as it is. When hold time reaches a predetermined time (for example, 0.8 seconds), the reaction force command value is reduced to 0 at a predetermined rate of change. Incidentally, the predetermined rate of change and the predetermined reaction force command value may both be changed according to the vehicle speed or the distance to the obstacle. The accelerator pedal manipulation reaction force generation device 30 controls the manipulation reaction force of the accelerator pedal so as to achieve the reaction force command value calculated by the accelerator pedal manipulation reaction force control unit 29.

The alarm decision unit 31 determines to give an alarm by a sound or a buzzer or the like to give the warning of the approach of the obstacle, when any of conditions A07 to A09 described below is established. It is to be here noted that the first risk, the second risk (the distance value) and the second risk (the approach time) obtained by multiplying their base values by the coefficient R1_K3 or R2_K3 for the alarm are referred to as the first risk for alarm, the second risk (the distance value) for alarm and the second risk (the approach time) for alarm, respectively.

A07: the first risk for alarm>the rear sensor detected distance

A08: the second risk (the distance value) for alarm>the side sensor detected distance A09: the second risk (the approach time) for alarm>the side sensor approach time When the alarm decision unit 31 determines to give the alarm, the alarm control unit 32 repeatedly turns on and off a buzzer driving signal for a predetermined time. The alarm device 33 gives the alarm based on the buzzer driving signal calculated by the alarm control unit 32. For example, a predetermined beep is repeatedly emitted. Alternatively, the alarm may be continuously sounded while any of the above-described conditions is satisfied. Further, simultaneously with the alarm, a light emitter such as an indicator installed in a meter may flash on and off.

The driving force control decision unit 34 determines to perform the driving force control to give the warning of the approach of the obstacle, when any of conditions A10 to A12 described below is established. It is to be here noted that the first risk, the second risk (the distance value) and the second risk (the approach time) obtained by multiplying their base values by the coefficient R1_K4 or R2_K4 for the driving force are referred to as the first risk for driving force, the second risk (the distance value) for driving force and the second risk (the approach time) for driving force, respectively.

A10: the first risk for driving force>the rear sensor detected distance

A11: the second risk (the distance value) for driving force>the side sensor detected distance A12: the second risk (the approach time) for driving force>the side sensor approach time When the driving force control decision unit 34 determines to perform the driving force control, the driving force control unit 35 increases the amount of reduction in the accelerator opening at a predetermined rate of change. When the amount of reduction in the accelerator opening reaches a predetermined value, the amount of reduction is maintained as it is. When the amount of reduction is maintained for a predetermined time, the amount of reduction in the accelerator opening is reduced to 0. The final throttle opening of the engine has a value obtained by subtracting the amount of reduction in the accelerator opening calculated by the driving force control unit 35 from the accelerator opening operated by the driver. Incidentally, the predetermined rate of change and the predetermined value of the amount of reduction in the accelerator opening may both be changed according to the vehicle speed or the distance to the obstacle. The driving force generation device 36 controls engine power based on the final throttle opening of the engine calculated by the driving force control unit 35.

In this manner, warning is determined based on the obstacle's approach time, and thereby, the warning of an obstacle can be provided when the obstacle is approaching the vehicle 1 at high speed even if there is a great distance to the obstacle detected by the rear obstacle detection sensors 13e to 13h or the side obstacle detection sensors 19a to 19d. This enables recognizing a potential danger of the obstacle, thus providing the properly timed warning.

Figure 2:
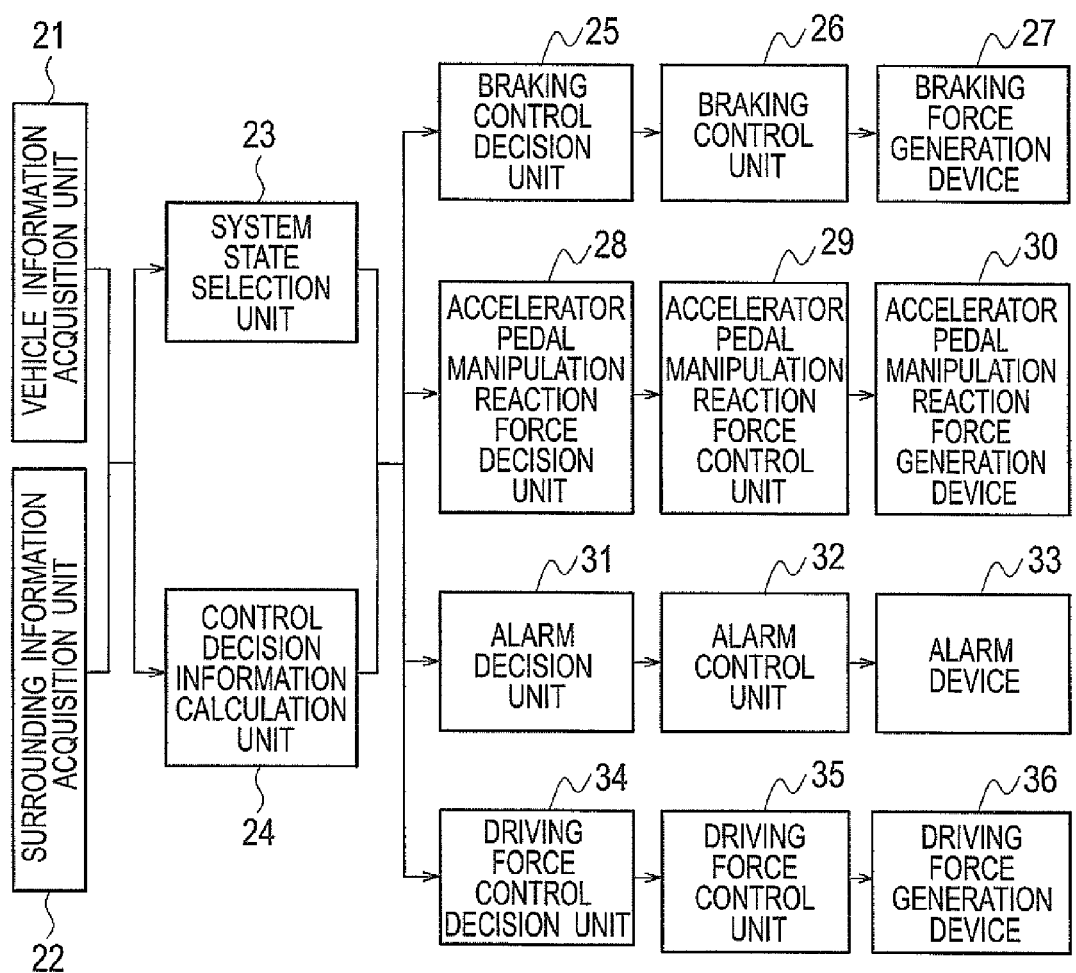
FIG. 2 is a block diagram illustrating a configuration of the travel control device according to the embodiment.

Incidentally, the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35, illustrated in FIG. 2 can be configured as a portion of the vehicle control device 2 of FIG. 1. Of course, a processing unit which is different from the vehicle control device 2 is prepared, and a CPU in the processing unit executes a previously stored computer program. This may implement operation of the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35.

[Travel Control Operation]

When the vehicle 1 moves rearward, a control unit of the travel control device having the above-described configuration executes travel control operation given below thereby to enable performing proper warning control on an obstacle detected by the rear obstacle detection sensors 13e to 13h or the side obstacle detection sensors 19a to 19d. Description will be given below with reference to a flowchart of FIG. 7 with regard to how the travel control device operates when executing the travel control operation. Incidentally, in an example of FIG. 7, description will be given taking a case where no warning is provided, as an example of suppression of warning by the warning unit.

Figure 7:
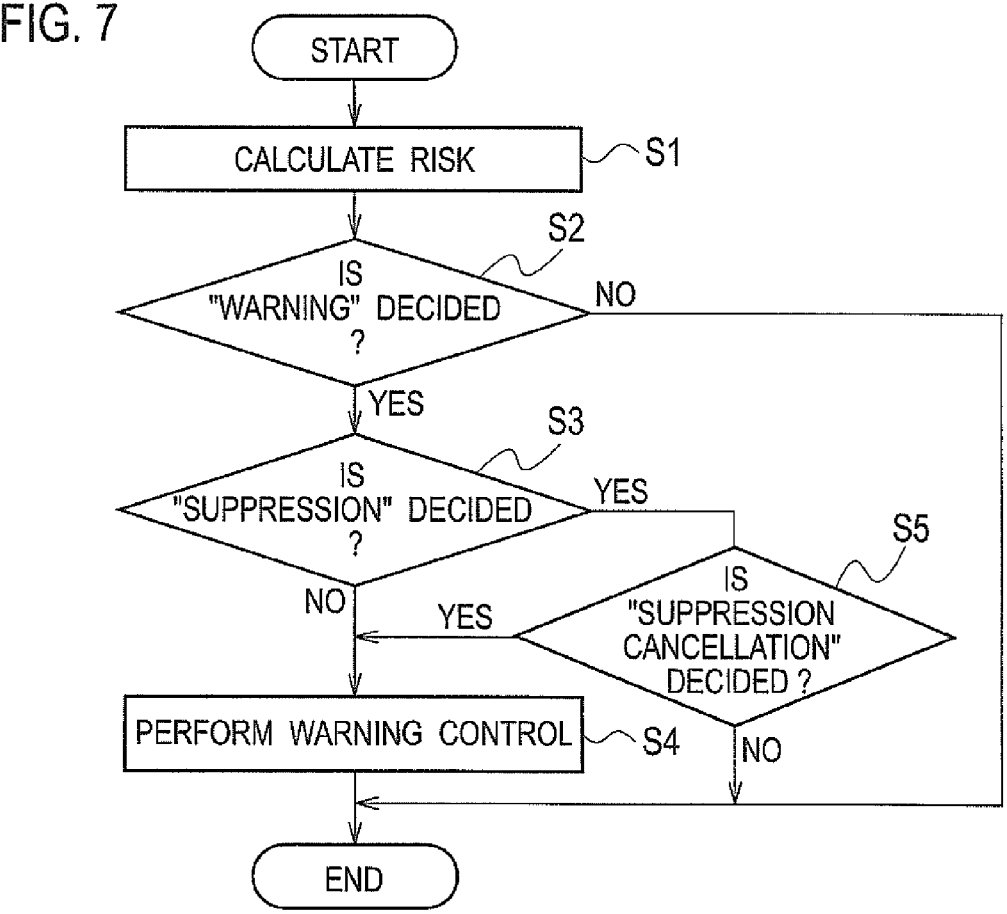
FIG. 7 is a flowchart illustrating how the travel control device operates when executing travel control operation.

The flowchart of FIG. 7 starts at the time when the system state selection unit 23 determines that the on-off switch for the travel control device is in the on state and the shift position detection unit 9 determines that the shift position of the vehicle 1 is located in the R (rearward movement) position, and the travel control operation goes to step S1 to perform processing. Then, the travel control operation is repeatedly executed so long as the on-off switch for the travel control device is in the on state and the shift position of the vehicle 1 is located in the R position. Also, the timing of start of the travel control operation is not limited to the above-described condition; besides the above-described condition, a condition such for example as where the vehicle speed is equal to or less than a predetermined value or the steering angle of the steering wheel is equal to or less than a predetermined value may be added.

In the processing of step S1, the first risk calculation unit 48 and the second risk calculation unit 49 determine the first risk or the second risk for each warning control. Specifically, the first risk for braking, the second risk (the distance value) for braking, the second risk (the approach time) for braking, the first risk for APD, the second risk (the distance value) for APD, the second risk (the approach time) for APD, the first risk for alarm, the second risk (the distance value) for alarm, the second risk (the approach time) for alarm, the first risk for driving force, the second risk (the distance value) for driving force, and the second risk (the approach time) for driving force are calculated.

In processing of step S2, the braking control decision unit 25, the accelerator pedal manipulation reaction force decision unit 28, the alarm decision unit 31, and the driving force control decision unit 34 determine whether or not to give a warning of the approach of the obstacle in accordance with the above-described conditions A01 to A12. If a decision is made to give the warning (YES at step S2), the operation goes to step S3; meanwhile, if a decision is not made to give the warning (NO at step S2), the flow of FIG. 7 comes to an end.

In processing of step S3, the suppression decision unit 47 determines whether or not to suppress warning by the warning unit, based on the condition A-1, the condition A-2, or the condition A-3. In this example, a decision is made as to whether or not to stop the warning by the warning unit.

Specifically, if the shift position detection unit 9 detects the rearward movement position and the detection angle area KR1 to KR7 in which the obstacle is detected shifts from the rear side to the lateral side, the suppression decision unit 47 stops the warning unit from providing the warning about the obstacle (YES at step S3). If the shift position detection unit 9 does not detect the rearward movement position or the detection angle area KR1 to KR7 in which the obstacle is detected does not shift from the rear side to the lateral side, a decision is not made to stop the warning by the warning unit (NO at step S3), and the operation goes to step S4 to perform the warning by the warning unit. If an affirmative (YES) is given at step S3, the operation goes to step S5.

In processing of step S5, the suppression decision unit 47 determines whether or not to cancel the suppression of the warning, based on the condition B-1 or the condition B-2. If a decision is made to cancel the suppression of the warning (YES at step S5), the operation goes to step S4; meanwhile, if a decision is not made to cancel the suppression of the warning (NO at step S5), the flow of FIG. 7 comes to an end.

Figure 10:
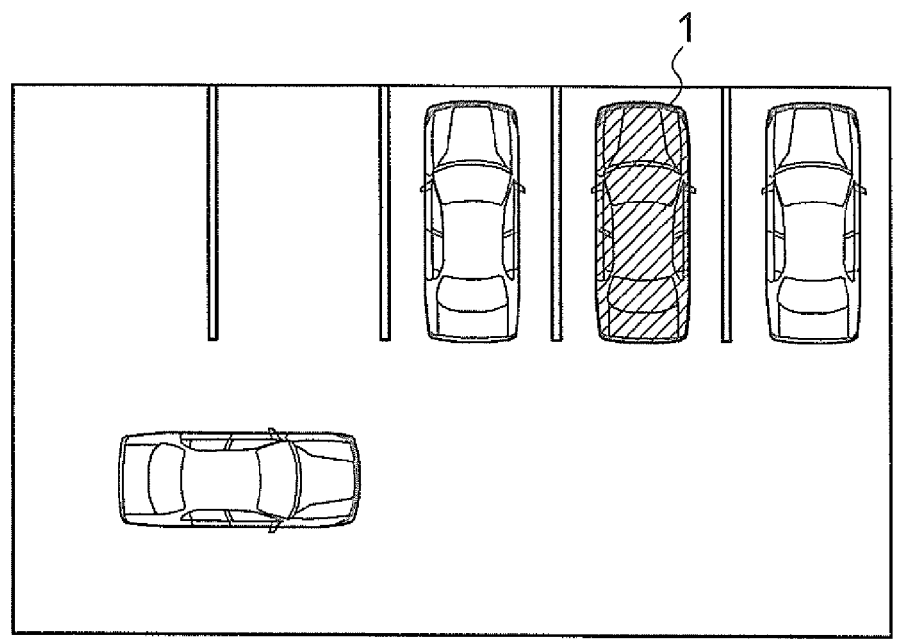
FIG. 10 is a plan view illustrating a case where a vehicle 1 is parked from its front side, as an example of a situation where it is desired to cancel suppression of warning.

As described above, when the vehicle 1 moves rearward for parallel parking, it is possible to suppress a warning being issued about the vehicle 61 running along a driving lane and passing by the lateral side of the vehicle 1, so that a driver's uneasy feeling can be reduced. Also, even after a decision has been temporarily made to suppress warning, a normal alarm can be given by canceling suppression, based on a predetermined condition. Thus, proper warning control can be performed even in a situation where it is desired to cancel suppression of warning, such as when the vehicle 1 is parked from its front side, as illustrated in FIG. 10.

If (or under the condition A-1 where) the shift position detection unit 9 detects the rearward movement position and the detection angle area KR1 to KR7 in which the obstacle is detected shifts from the rear side to the lateral side, the suppression decision unit 47 suppresses the warning unit providing warning about the obstacle. This enables suppressing unnecessary warning about the vehicle 61 passing by the lateral side of the vehicle 1, thus reducing an uneasy feeling which the driver may have.

The cases where the detection angle area KR1 to KR7 in which the obstacle is detected shifts from the rear side to the lateral side include the case where, first (or at the time t1), the obstacle is detected in the rearmost detection angle area KR7, and then (or at the time t2), the obstacle is detected in the detection angle area KR6 adjacent to the rearmost detection angle area KR7. The vehicle 61 passing by the lateral side of the vehicle 1 can be accurately determined.

The cases where the detection angle area KR1 to KR7 in which the obstacle is detected shifts from the rear side to the lateral side may further include the case where the side obstacle detection sensors 19a to 19c start detecting the obstacle simultaneously in the rearmost detection angle area KR7 and the detection angle area KR6 adjacent to the rearmost detection angle area KR7. The vehicle 61 passing by the lateral side of the vehicle 1 can be more accurately determined.

The suppression decision unit 47 may suppress warning by the warning unit, rather than under the condition A-1, if (or under the condition A-2 where) the shift position detection unit 9 detects the rearward movement position and the obstacle is simultaneously detected for the predetermined time or longer in the rearmost detection angle area KR7 and the detection angle area KR6 adjacent to the rearmost detection angle area KR7. Thereby, a warning can be issued about the obstacle which is not simultaneously detected for the predetermined time or longer in the detection angle area KR7 and the detection angle area KR6, and thus, proper warning suppression control can be achieved.

The suppression decision unit 47 may suppress warning by the warning unit, rather than under the condition A-1 or the condition A-2, if (or under the condition A-3 where) the shift position detection unit 9 detects the rearward movement position and the approach time for the obstacle detected in the rearmost detection angle area KR7 or the detection angle area KR6 adjacent to the rearmost detection angle area KR7 is shorter than the approach threshold (for example, 4 seconds). If the approach time for the obstacle is shorter than the approach threshold, there is a great likelihood that the obstacle may be the vehicle 61 passing by the lateral side of the vehicle 1, and thus, proper warning suppression control can be achieved.

The suppression decision unit 47 cancels suppression of warning, if (or under the condition B-1 where) the obstacle is no longer detected in the detection angle area KR6 adjacent to the rearmost detection angle area KR7 before being no longer detected in the rearmost detection angle area KR7. Thereby, a proper warning can be issued.

The suppression decision unit 47 may cancel suppression of warning, rather than under the condition B-1, if (or under the condition B-2 where) the side obstacle detection sensors 19a to 19c detect the obstacle in the other detection angle areas KR1 to KR5 exclusive of the rearmost detection angle area KR7 and the detection angle area KR6 adjacent to the rearmost detection angle area KR7. A decision can be made that the obstacle detected in the other detection angle areas KR1 to KR5 exclusive of the rearmost detection angle area KR7 and the detection angle area KR6 is not the vehicle passing by the lateral side of the vehicle 1, and thus, a proper warning can be issued by canceling the suppression of the warning.

While the contents of the present invention have been described above with reference to the embodiment and examples, it is to be understood that the present invention is not limited to these descriptions, and it would be obvious to one of ordinary skill in the art that various modifications and improvements could be made thereto.

According to the travel control device and travel control method according to the embodiment, it is possible to reduce an uneasy feeling which a driver may have, by suppressing activation of warning about a vehicle passing by a lateral side of a driver's vehicle and not desired to be an object for warning, when the driver's vehicle is parallel parked. Therefore, the present invention has industrial applicability.

The invention claimed is:

1. A travel control device comprising:
   a side obstacle detection unit which divides a range from a lateral side to a rear side of a vehicle into a plurality of detection angle areas, and detects, for each of the plurality of detection angle areas, an obstacle entering the detection angle area and a distance to the obstacle;
   a rearward movement preparation detection unit which detects the vehicle preparing to move rearward;
   a warning unit which provides warning about the obstacle detected by the side obstacle detection unit; and
   a suppression unit which suppresses the warning by the warning unit, if the rearward movement preparation detection unit detects the vehicle preparing to move rearward and the detection angle area in which the obstacle is detected shifts from the rear side to the lateral side.

2. The travel control device according to claim 1, wherein cases where the detection angle area in which the obstacle is detected shifts from the rear side to the lateral side include a case where, first, the obstacle is detected in the rearmost detection angle area, and then, the obstacle is detected in the detection angle area adjacent to the rearmost detection angle area.

3. The travel control device according to claim 2, wherein the cases where the detection angle area in which the obstacle is detected shifts from the rear side to the lateral side further include a case where the side obstacle detection unit starts detecting the obstacle simultaneously in the rearmost detection angle area and the detection angle area adjacent to the rearmost detection angle area.

4. The travel control device according to claim 1, wherein the suppression unit suppresses the warning by the warning unit, if the rearward movement preparation detection unit detects the vehicle preparing to move rearward and the obstacle is simultaneously detected for a predetermined time or longer in the rearmost detection angle area and the detection angle area adjacent to the rearmost detection angle area.

5. The travel control device according to claim 1, further comprising:
   a relative speed estimation unit which estimates a speed relative to the obstacle on the basis of the distance to the obstacle detected by the side obstacle detection unit; and
   an approach time estimation unit which estimates an approach time which is a time required for the obstacle to approach the vehicle on the basis of the distance to the obstacle detected by the side obstacle detection unit and the speed relative to the obstacle estimated by the relative speed estimation unit,
   wherein the suppression unit suppresses the warning by the warning unit, if the rearward movement preparation detection unit detects the vehicle preparing to move rearward and the approach time for the obstacle detected in the rearmost detection angle area or the detection angle area adjacent to the rearmost detection angle area is shorter than an approach threshold.

6. The travel control device according to claim 1, wherein the suppression unit cancels the suppression of the warning, if the obstacle is no longer detected in the detection angle area adjacent to the rearmost detection angle area before being no longer detected in the rearmost detection angle area.

7. The travel control device according to claim 1, wherein the suppression unit cancels the suppression of the warning, if the side obstacle detection unit detects the obstacle in any of the detection angle areas other than the rearmost detection angle area and the detection angle area adjacent to the rearmost detection angle area.

8. A travel control method using a travel control device including: a side obstacle detection unit which divides a range from a lateral side to a rear side of a vehicle into a plurality of detection angle areas, and detects, for each of the plurality of detection angle areas, an obstacle entering the detection angle area and a distance to the obstacle; a rearward movement preparation detection unit which detects the vehicle preparing to move rearward; and a warning unit which provides warning about the obstacle detected by the side obstacle detection unit, the method comprising:
   suppressing the warning by the warning unit, if the rearward movement preparation detection unit detects the vehicle preparing to move rearward and the detection angle area in which the obstacle is detected shifts from the rear side to the lateral side.

9. A travel control device comprising:
   side obstacle detecting means for dividing a range from a lateral side to a rear side of a vehicle into a plurality of detection angle areas, and for detecting, for each of the plurality of detection angle areas, an obstacle entering the detection angle area and a distance to the obstacle;
   rearward movement preparation detecting means for detecting the vehicle preparing to move rearward;
   warning means for providing warning about the obstacle detected by the side obstacle detecting means; and
   suppressing means for suppressing the warning by the warning means, if the rearward movement preparation detecting means detect the vehicle preparing to move rearward and the detection angle area in which the obstacle is detected shifts from the rear side to the lateral side.

* * * * *